US 7,539,934 B2
May 26, 2009

(54) COMPUTER-IMPLEMENTED METHOD, SYSTEM, AND PROGRAM PRODUCT FOR DEVELOPING A CONTENT ANNOTATION LEXICON

(75) Inventors: John R. Kender, Leonia, NJ (US); Milind R. Naphade, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 11/157,035

(22) Filed: Jun. 20, 2005

(65) Prior Publication Data

US 2006/0288272 A1    Dec. 21, 2006

(51) Int. Cl.
    *G06F 17/00*     (2006.01)
(52) U.S. Cl. .................. 715/233; 715/230; 715/231
(58) Field of Classification Search .......... 715/230–233
    See application file for complete search history.

(56) References Cited

U.S. PATENT DOCUMENTS

| 7,028,253 | B1 * | 4/2006 | Lieberman et al. ........... 715/232 |
| 2003/0070139 | A1 * | 4/2003 | Marshall et al. ............. 715/512 |
| 2004/0194021 | A1 * | 9/2004 | Marshall et al. ............. 715/512 |
| 2005/0027664 | A1 * | 2/2005 | Johnson et al. ............... 706/12 |
| 2005/0114758 | A1 * | 5/2005 | Lang et al. .................. 715/512 |
| 2005/0246625 | A1 * | 11/2005 | Iyengar et al. ............... 715/512 |
| 2006/0218485 | A1 * | 9/2006 | Blumenthal .................. 715/512 |
| 2007/0055926 | A1 * | 3/2007 | Christiansen et al. ......... 715/512 |
| 2008/0005651 | A1 * | 1/2008 | Grefenstette et al. ......... 715/500 |

OTHER PUBLICATIONS

Lin et al., "Video Collaborative Annotation Forum: Establishing Gound-Truth Labels on Large Multimedia Datasets", in Proceedings of the TRECVID 2003 Workshop, National Institute of Standards and Technology, Nov. 2003.
Noy et al., "Ontology Development 101: A Guide to Creating Your First Ontology", Stanford Knowledge Systems Laboratory Technical Report KSL-01-05, pp. 1-25, Mar. 2001.
Papka et al., "UMASS Approaches to Detection and Tracking at TDT2", in Proceedings of the DARPA Broadcast News Workshop, National Institute of Standards and Technology, Feb.-Mar. 1999.

* cited by examiner

*Primary Examiner*—Thu Huynh
(74) *Attorney, Agent, or Firm*—Lou Percello; Hoffman Warnick LLC

(57) ABSTRACT

A method, system and program product developing an annotation lexicon are described. Under aspects of the present invention, annotation(s) to piece(s) of content are received and analyzed using one or more computational analyses. Based on the analyses, feedback will be generated to improve the annotation lexicon and/or the ontology thereof. Such improvement can lead to, among other things: the re-arrangement of interrelationships of terms in the annotation lexicon; the addition, modification or deletion of terms from the annotation lexicon; the re-arrangement or clustering of terms within the annotation lexicon; etc.

15 Claims, 2 Drawing Sheets

COMPUTER-IMPLEMENTED METHOD, SYSTEM, AND PROGRAM PRODUCT FOR DEVELOPING A CONTENT ANNOTATION LEXICON

STATEMENT OF GOVERNMENT RIGHTS

This invention was made with Government support under Contract 2004H839800 000 awarded by (will be provided). The Government has certain rights in this invention.

CROSS-REFERENCE TO RELATED APPLICATIONS

This application is related in some aspects to the commonly assigned application entitled "Computer-Implemented Method, System, and Program Product For Evaluating Annotations to Content" that was filed on Jun. 21, 2005, and is assigned Ser. No. 11/158,223 the entire contents of which are hereby incorporated by reference. This application is also related in some aspects to the commonly assigned application entitled "Computer-Implemented Method, System, and Program Product For Tracking Content" that was filed on Jun. 16, 2005 and is assigned Ser. No. 11/154,752 the entire contents of which are hereby incorporated by reference.

BACKGROUND OF THE INVENTION

1. Field of the Invention

The present invention generally relates to (content) annotation lexicon development. Specifically, the present invention relates to a computer-implemented method, system and program product that analyzes content annotations to improve an annotation lexicon and its corresponding ontology.

2. Related Art

Content indexing/annotation is rapidly becoming a valuable resource in tracking and managing content (e.g., video broadcasts, audio broadcasts, Internet content, electronic mail messages, etc.). To annotate content, annotators (known in the art as Ontologists) will attach descriptive terms or concepts to the content. Such terms are typically drawn from an annotation lexicon. Unfortunately, in annotating content, annotators tend to ignore the most common terms. For example, few annotators have consistently annotated the type of background that is present in a piece of content, instead focusing more on the foreground. Even then, the annotators tend to ignore terms that are almost always present, such as "people" or "people-action" types of terms such as "walking". Conversely, when uncertain or frustrated, annotators tend to invent terms just so that they can annotate something. The result can be annotations that are unnecessarily long: "Fortieth anniversary of the Freedom Rides" or "Princess Diana car wreck".

Additionally, there is a trade off between the use of high-level terms of human value, such as "negotiating" or "planning", and low-level machine-computable terms, such as "periodic texture" or "oscillating motion". However, in general, annotators have little knowledge of machine capabilities, and system builders have little knowledge of what is most useful to people using content (e.g., videos) for their own (human) purposes. Existing approaches for lexicon creation depend heavily on heuristics, such as "if a term has more than a dozen sub-terms, then an intermediate term may be necessary." Unfortunately, the existing approaches admit that there is no single correct class hierarchy for any given domain. Moreover, existing approaches fail to comment on the specialized properties of specifically visual terms. Still yet, the existing approaches fail to provide any automated tools for refining or clustering the annotation lexicon. Given that most or all annotations are drawn from the annotation lexicon, continual development (e.g., improvement) thereof could greatly improve the quality of annotations.

In view of the foregoing, there exists a need for an approach that allows an annotation lexicon to be developed and/or improved.

SUMMARY OF THE INVENTION

In general, the present invention provides a computer-implemented method, system, and program product for developing a (content) annotation lexicon. Specifically, under the present invention, a set (e.g., one or more) of annotations to one or more pieces of content are received or otherwise obtained from one or more annotators. The annotation(s) include one or more terms/concepts that describe the underlying piece of content. Moreover, the annotation(s) are typically drawn from an annotation lexicon that includes a plurality of terms or concepts interrelated with one another. The interrelationship between the terms is known in the art as "ontology" and can be a hierarchical tree-like structure or other suitable format. In any event, the annotation(s) are subject to one or more computational tests/analyses under the present invention to determine their effectiveness. Based on the analyses, the annotation lexicon is (further) developed/improved. In developing the annotation lexicon, the lexicon itself and/or its ontology can be altered (e.g., terms can be added, modified or deleted; interrelationships can be changed, etc.).

Under the present invention, the plurality of computational tests include: a computational test to determine whether term(s) in the annotation(s) meets with an expected frequency of use; a computational test to determine whether any groupings of the term(s) in the annotation(s) are commonly used together; a computational test to determine whether any groupings of the term(s) in the annotations are rarely used together; a computational test to determine which of the term(s) is most predictive of the associated content; a computational test to determine one or more clusters of the term(s); a computational test to determine whether the term(s) sufficiently identifies a context of the associated content; and a computational test to determine whether the term(s) is used by multiple annotators.

A first aspect of the present invention provides a computer-implemented method for developing an annotation lexicon, comprising: obtaining a set of annotations for at least one piece of content, wherein each annotation includes at least one term that describes a corresponding piece of content, and wherein the at least one term is drawn from the annotation lexicon; analyzing the set of annotations using at least one of a plurality of computational tests to determine an effectiveness of the at least one term; and providing feedback based on the analyzing to develop the annotation lexicon.

A second aspect of the present invention provides a system for developing an annotation lexicon, comprising: an annotation system for obtaining a set of annotations for at least one piece of content, wherein each annotation includes at least one term that describes a corresponding piece of content, and wherein the at least one term is drawn from the annotation lexicon; an annotation analysis system for analyzing the set of annotations using at least one of a plurality of computational tests to determine an effectiveness of the at least one term; and a feedback system for providing feedback based on the analyzing to develop the annotation lexicon.

A third aspect of the present invention provides a program product stored on a computer-useable medium for developing an annotation lexicon, the computer-useable medium comprising program code for causing a computer system to perform the following steps: obtaining a set of annotations for at least one piece of content, wherein each annotation includes at least one term that describes a corresponding piece of content, and wherein the at least one term is drawn from the annotation lexicon; analyzing the set of annotations using at least one of a plurality of computational tests to determine an effectiveness of the at least one term; and providing feedback based on the analyzing to develop the annotation lexicon.

A fourth aspect of the present invention provides a method for deploying an application for developing an annotation lexicon, comprising: providing a computer infrastructure being operable to: obtain a set of annotations for at least one piece of content, wherein each annotation includes at least one term that describes a corresponding piece of content, and wherein the at least one term is drawn from the annotation lexicon; analyze the set of annotations using at least one of a plurality of computational tests to determine an effectiveness of the at least one term; and provide feedback based on the analyzing to develop the annotation lexicon.

A fifth aspect of the present invention provides computer software embodied in a propagated signal for developing an annotation lexicon, the computer software comprising instructions for causing a computer system to perform the following steps: obtain a set of annotations for at least one piece of content, wherein each annotation includes at least one term that describes a corresponding piece of content, and wherein the at least one term is drawn from the annotation lexicon; analyze the set of annotations using at least one of a plurality of computational tests to determine an effectiveness of the at least one term; and provide feedback based on the analyzing to develop the annotation lexicon.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
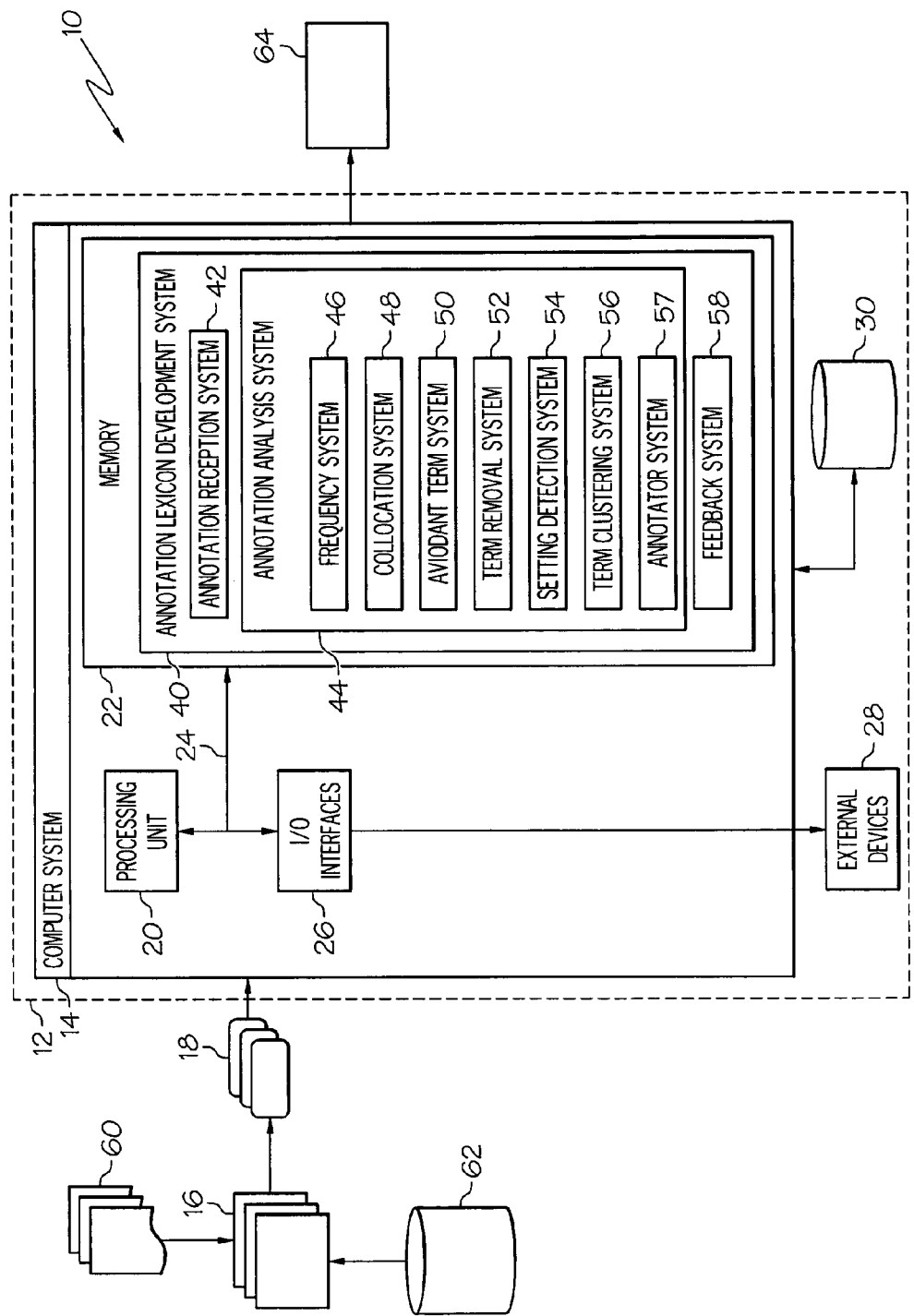
FIG. 1 shows an illustrative system for developing an annotation lexicon according to the present invention.

It is noted that the drawings of the invention are not to scale. The drawings are intended to depict only typical aspects of the invention, and therefore should not be considered as limiting the scope of the invention. In the drawings, like numbering represents like terms between the drawings.

DETAILED DESCRIPTION OF THE INVENTION

For convenience purposes, the Detailed Description of the Invention will have the following sections:

I. Computerized Implementation
II. Annotation Analysis
   A. Frequency of Use
   B. Collocations
   C. Avoidant Terms
   D. Removal of Terms
   E. Setting Detection
   F. Term Clustering
   G. Inter-Annotator Agreement
III. Feedback
IV. Additional Implementations I. Computerized Implementation Referring now to FIG. 1, a system 10 for developing a (content) annotation lexicon 62 according to the present invention is shown. Specifically, FIG. 1 depicts a system 10 in which a set (e.g., one or more) of annotations (hereinafter "annotation(s) 18") made to one or more pieces of content (hereinafter "piece(s) of content 60") by one or more annotators (hereinafter "annotator(s)" 16) can be analyzed so that annotation lexicon 62 from which annotation(s) 18 are drawn can be developed and/or improved. It should be understood in advance that although in an illustrative example, piece(s) of content 60 comprises a news story, this need not be the case. Rather, the present invention could be practiced with respect to any type of content (e.g., television content, radio content, Internet content, electronic mail messages, etc.). It should also be understood in advance that, annotator(s) 16 can be a human Ontologist(s), a computer program(s), or a human Ontologist(s) working with a computer program(s).

In any event, as depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to evaluate annotations.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as annotation lexicon development system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention such as annotation(s) 18, piece(s) of content 60, analyses results, feedback 64, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is annotation lexicon development system 40, which includes annotation reception system 42, annotation analysis system 44, and feedback system 58. As further shown, annotation analysis system 44 includes frequency system 46, collocation system 48, avoidant term system 50, term removal system 52, setting detection system 54, term clustering system 56, and annotator system 57. The functions of these systems will be described in detail in Section II below.

II. Annotation Analysis

In general, annotator(s) 16 make annotation(s) 18 to piece(s) of content 60 using terms or concepts drawn from annotation lexicon 62. Such terms generally describe the underlying/associated piece of content. As known in the art, annotation lexicon 62 typically includes a body of terms that are interrelated with one another (e.g., in a hierarchical tree-like structure). Terms that are located close to one another in annotation lexicon 62 should be terms that can logically be used with one another (e.g., in the same annotation). An example of this would be a node in annotation lexicon 62 for the term "President" having sub-nodes for the terms "Clinton", "Bush", etc. In addition, it should be understood that although a single annotation lexicon 62 is depicted, this need not be the case. For example, separate annotation lexicons could be provided for each type of content (news, sports, etc.) and/or medium (television, radio, Internet, electronic mail, etc.) by which it is delivered.

In any event, annotation(s) 18 will be received or otherwise obtained (e.g., retrieved from storage) by annotation reception system 42. Upon receipt, annotation analysis system 44 (e.g., the sub-systems thereof) will subject annotation(s) 18 to one or more of a plurality of computational tests to determine, among other things, the effectiveness of the terms. Based on the analysis, feedback system 58 will generate feedback to develop annotation lexicon 62.

Before the different computational tests are described in detail, it should be understood that the present invention can be run in a variety of modes: (1) real-time, as an annotator is trying to expand the term vocabulary; (2) periodically, such as every night, consolidating and verifying the efforts of many annotators; and/or (3) on-demand such as whenever the investment of reviewing the entire annotation lexicon 62 is justified.

A. Frequency of Use

A first computational test can be applied to annotation(s) 18 by frequency system 46 to determine whether the term(s) in annotation(s) 18 meets with an expected frequency of use. Specifically, without applying the teaching of the present invention, current annotation lexicons tend to be overly sparse. This can generally be documented by using terms from an annotation lexicon to annotate a series of video broadcasts, and plotting the log of probability of term occurrence against the log of term rank according to Zipf's law. Stated in logarithms, Zipf's law says $\log(f(i))=c-\log(r(i))$, where f and r are frequency and rank, respectively, i is the index for the "ith" term, and c is any term in the lexicon. Moreover, under Zipf's law, $\log(\text{prob}(c))=m*\log(\text{rank}(c))+b$. In general, Zipf's law postulates that a mature vocabulary shows a slope of exactly −1 in such a graph. Current video term annotation lexicons instead indicate a slope between −3 and −2. This indicates that current annotation lexicons are over-populated by popular short-length generic terms and are under-populated with more unusual long-length specific terms. Moreover, this indicates that short-length terms are used frequently, long-length terms are used infrequently, while medium-length terms occur with a frequency between that of short terms and long terms. Along these lines, violations of Zipf's law tend to show that many annotation lexicons such as annotation lexicon 62 include too few "middle-level" terms, such as "fixed winged aircraft", and too many "high-level" terms such as "vehicle".

Frequency system 46 will apply Zipf's law to calculate whether the term(s) of annotation(s) 18 are too generic or too specific, or too frequent or too infrequent. For example, in annotation(s) 18 for sports-related piece(s) of content 60, the term "ball" should occur a lot more than the term "javelin". Thus, based on Zipf's law, frequency system 46 can analyze the relationship between the length of the term(s) in annotation(s) and its probability of occurrence, in order to determine whether the terms meet an expected frequency of use. Based on this analysis, feedback 64 can be provided to improve annotation lexicon 62.

B. Collocations

Another computational test can be applied to annotation(s) 18 by collocation system 48 to determine whether any groupings of the term(s) in annotation(s) 18 are commonly used together. Collocation system 48 could do so based on a $G^2$ measurement. This is a more precise measure than chi-square for sparse vocabularies, although it has not yet been previously to video analysis. For example, for each pair of terms, X and Y, collocation system 48 could form a two-by-two contingency table for the occurrence of X and Y within the same "shot", and then compute $H(\text{table})-H(\text{rows})-H(\text{columns})$, where $H(.)$ is an entropy function. In this case, extreme values could signal collocations. Term pairs with a high $G^2$ score ("male face", "male speech") suggest that they should be merged into a single term. To this extent, collocation system 48 could utilize a monitoring method that determines if the terms are ones that tend to co-occur in pairs or triplets (like "blue", "sky"). Collocated terms, such as "male" and "football_player", could indicate that annotation lexicon 62 or its ontology needs to be better controlled. In this example, "football_player" should be made a sub-term of "male", not a separate term. Thus, changing of the interrelationships between these terms in annotation lexicon 62 is needed. Feedback 64 can direct such changing.

C. Avoidant Terms

Another computational test can be applied to annotation(s) by avoidant term system 50 to determine whether any groupings of the term(s) in annotation(s) 18 are rarely used together. Specifically, terms that are not often used together can be detected by measuring their (negative) mutual information. Such terms suggest areas in which the annotation lexicon 62 should be expanded. As indicated above, redundant terms that tend to occur often together within a video broadcast are easily determined by applying the $G^2$ measurement of natural language processing. To determine whether annotation(s) include terms that are rarely used together (e.g., referred to as "avoidant" terms), point-wise mutual information, $I(X; Y)=H(X)-H(X|Y)$ could be used. Specifically, if this value is negative, it indicates that knowing that term "X" appears within a "shot" decreases the likelihood that term "Y" also appears. Similarly, instances where terms are not used together, such as "female" and "football_player", indicated that the ontology (e.g., hierarchical tree of terms in annotation lexicon 62) should make the two terms impossible to use together. Thus feedback 65 can direct the relocation of terms in the ontology to increase the distance between one another. For example: a "person" can be "male" or "female", and a "male" can be a "football_player" or "priest". This automatically insures that "females" are excluded from being described as playing football or saying Catholic services.

D. Removal of Terms

Another computational test can be applied to annotation(s) by term removal system 52 to determine which of the term(s) is most predictive of the piece(s) of content 60. In particular, the specificity with which a term aids in the classification of a piece of content can be computed from its information gain measurement (i.e., information gain is a computation that shows which terms are most predictive of the piece of content). For example, the term "reporter" would have low information gain for news stories, as very many news stories have a reporter in them and knowing there was a reporter would not help discover what "kind" of news story it was. However, the term "soldier" would have high information gain in separating foreign news from domestic news, and the term "kindergartener" would have very high information gain in distinguishing human-event stories from, for example, sports stories.

Information gain for each term could be defined under the present invention by the binarization $Gain(S,C)=H(S)-(|S_p|/|S|)H(S_p)-(|S_n|/|S|)H(S_n)$, where S is the story, C is the term, $H(.)$ is entropy, and $S_p$ is the subset of broadcasts positively having the term C, with $S_n$ defined analogously. To this extent, terms with high information gain (e.g., physical locations) are generally appropriate and should be retained under the present invention, while terms with low information gain are too generic and should be refined or removed from annotation lexicon 62 (e.g., as directed by feedback 64). For example, by restricting annotation(s) of video news stories to descriptions of physical places (which have a high information gain measurement), the information gain is typically increased. This seems to reflect that the value of video is that there is a camera in a particular (unusual) environment: the "you are there" aspect. As such, an annotation lexicon for video or news story content could be limited to or could emphasize descriptions of physical places.

E. Setting Detection

Another computational test can be applied to annotation(s) 18 by setting detection system 54 and will determine whether the term(s) of annotation(s) 18 sufficiently identifies a context of piece(s) of content 60. It should be noted that the setting detection computational test is typically applied to video content such as television broadcasts or the like. To illustrate this, an example involving a video news broadcast will follow.

As mentioned above, terms with high information gain measurements appear to be terms involved with physical settings. In general, video news broadcasts are very effectively characterized by a description of their contexts/backgrounds, which suggests that an annotation lexicon of scenes and settings applies primarily to video. As such setting detection system 54 will analyze annotation(s)s for video-based piece(s) of content 60 to determine whether those annotation(s) 18 includes enough contextual or background-based terms. Based on the analysis, feedback 64 can be provided. For example, if could be the case the annotation lexicon 62 for video-based content does not include enough contextual terms. Feedback 64 could result in addition contextual terms being inserted into annotation lexicon 62.

F. Term Clustering

Another computational test can be applied to annotation(s) 18 by term clustering system 56 to determine one or more clusters of the term(s) of annotation(s) to identify terms most useful in sorting the piece(s) of content 60. In a typical embodiment, clustering system 56 applies a Laplacian eigenmap analysis. Specifically, various dimensionality reduction methods, such as principal component analysis or Laplacian eigenmaps, can cluster together multiple pieces of content 60 such as news broadcasts based solely on their visual terms. The Laplacian eigenmap method generally indicates that people tend to lump events together in a small number of groups, such as the segments of a news broadcast or the sections in a newspaper ("news", "sports", "weather", "business", etc.). Clustering system 56 identifies terms that are most useful in sorting piece(s) of content 60 into categories. Then, feedback 64 could direct a clustering of such terms in close proximity to one another in the ontology of annotation lexicon 62.

G. Inter-Annotator Agreement

Another computational test can be applied to annotation(s) 18 by annotator system 57 to determine whether terms in annotations (18) are being used by multiple annotator(s) 16. Specifically, it has been determined that when a term is used with frequency within a single time frame (e.g., a particular day), such usage is generally attributable to a single annotator. Annotator agreement system 57 can detect when terms are being used by multiple annotator(s) 16, in part, by determining whether such terms are used across multiple time frames (e.g., multiple days). To do so, annotator system 57 can maintain counts of the use of terms over time (e.g., days). A term could be highlighted as relevant or popular across multiple annotators 16 based on a certain usage of that term over a certain time period.

III. Feedback

Figure 2:
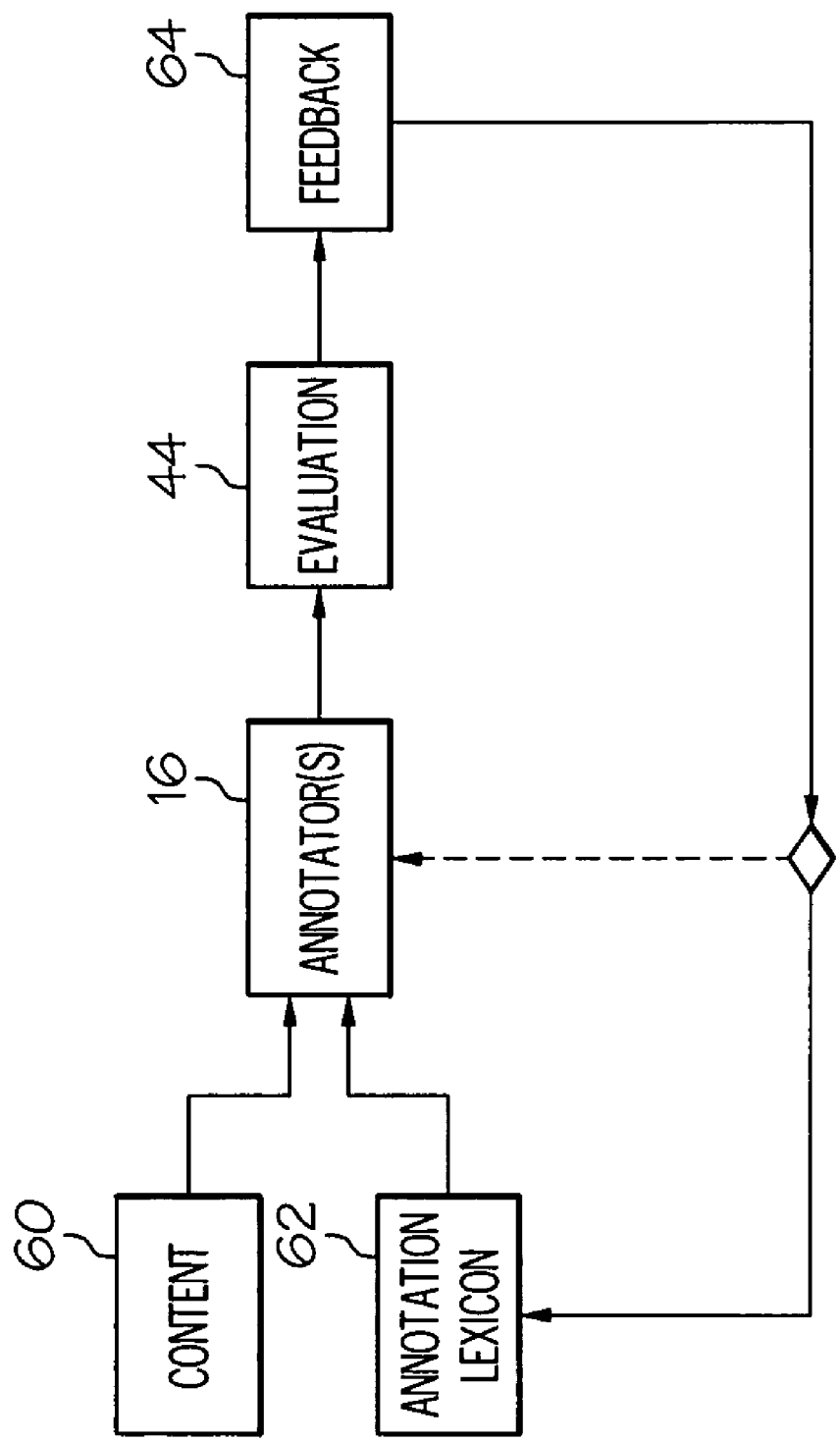
FIG. 2 shows a functional diagram for developing the annotation lexicon according to the present invention.

As indicated through this description, feedback 64 will be generated by annotation feedback system 58 for developing annotation lexicon 62. The feedback is typically based on the output or results generated by the sub-systems of annotation analysis system 44. Referring to FIG. 2, this process is shown in greater detail. Specifically, as depicted, annotator(s) 16 receives piece(s) of content 60 and uses annotation lexicon 62 to annotate the same. Such annotations are evaluated/analyzed by annotation analysis system 44 as discussed above in Section II above. Feedback 64 is generated based on the one or more analysis and used to develop annotation lexicon 64. For example, feedback 64 can indicate whether terms are not used frequently enough, whether interrelationships between the terms should be re-arranged/changed, whether terms themselves should be re-arranged or clustered in the ontology of annotation lexicon 62, whether terms should be added to or dropped from annotation lexicon 62, etc. In any event, feedback 64 will be used to improve annotation lexicon 62 and/or the ontology thereof.

IV. Additional Implementations

While shown and described herein as a method and system for developing an annotation lexicon, it is understood that the invention further provides various alternative embodiments. For example, in one embodiment, the invention provides a computer-readable medium that includes computer program code to enable a computer infrastructure to develop an annotation lexicon. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to develop an annotation lexicon. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for developing an annotation lexicon. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for developing an annotation lexicon, comprising:
   obtaining a set of annotations for at least one piece of content, the at least one piece of content including image data, wherein each annotation includes at least one term that describes a corresponding piece of content, and wherein the at least one term is drawn from the annotation lexicon;
   obtaining a plurality of computational tests, wherein the plurality of computational tests includes:
     a first computational test to determine whether the at least one term in the set of annotations meets with an expected frequency of use;
     a second computational test to determine whether any groupings of the at least one term in the set of annotations are commonly used together;
     a third computational test to determine whether any groupings of the at least one term in the set of annotations are rarely used together;
     a fourth computational test to determine which of the at least one term in the set of annotations is most predictive of the at least one piece of content; and
     a fifth computational test to determine one or more clusters of the at least one term in the set of annotations;
   analyzing the set of annotations using at least one of the plurality of computational tests to determine an effectiveness of the at least one term; and
   providing feedback based on the analyzing to develop the annotation lexicon.

2. The computer-implemented method of claim 1, wherein the annotation lexicon comprises a plurality of terms for annotating the at least one piece of content, wherein the plurality of terms are interrelated with one another within the annotation lexicon, and wherein the feedback is used to improve the plurality of terms or their interrelationships with one another.

3. The computer-implemented method of claim 1, wherein the plurality of computational test further comprises:
   a sixth computational test to determine whether the at least one term in the set of annotations sufficiently identifies a context of the at least one piece of content; and
   a seventh computational test to determine whether the at least one term in the set of annotations is used by multiple annotators.

4. The computer-implemented method of claim 1, wherein the first computational test is based on Zipf's law.

5. The computer-implemented method of claim 1, wherein the third computational test is based on a mutual information measurement.

6. The computer-implemented method of claim 1, wherein the fourth computational test is based on an information gain measurement.

7. The computer-implemented method of claim 1, wherein the fifth computational test is based on a Laplacian eigenmap analysis.

8. A system for developing an annotation lexicon, comprising:
   a computer device;
   an annotation system for obtaining a set of annotations for at least one piece of content, the at least one piece of content including image data, wherein each annotation includes at least one term that describes a corresponding piece of content, and wherein the at least one term is drawn from the annotation lexicon;
   a test system for obtaining a plurality of computational tests, wherein the plurality of computational tests includes:
      a first computational test to determine whether the at least one term in the set of annotations meets with an expected frequency of use;
      a second computational test to determine whether any groupings of the at least one term in the set of annotations are commonly used together;
      a third computational test to determine whether any groupings of the at least one term in the set of annotations are rarely used together;
      a fourth computational test to determine which of the at least one term in the set of annotations is most predictive of the at least one piece of content; and
      a fifth computational test to determine one or more clusters of the at least one term in the set of annotations;
   an annotation analysis system for analyzing the set of annotations using at least one of the plurality of computational tests to determine an effectiveness of the at least one term; and
   a feedback system for providing feedback based on the analyzing to develop the annotation lexicon.

9. The system of claim 8, wherein the annotation lexicon comprises a plurality of terms for annotating the at least one piece of content, wherein the plurality of terms are interrelated with one another within the annotation lexicon, and wherein the feedback is used to improve the plurality of terms or their interrelationships with one another.

10. The system of claim 8, wherein the plurality of computational test further comprises:
   a sixth computational test to determine whether the at least one term in the set of annotations sufficiently identifies a context of the at least one piece of content; and
   a seventh computational test to determine whether the at least one term in the set of annotations is used by multiple annotators.

11. A program product stored on a computer-readable storage medium for developing an annotation lexicon, the computer-readable storage device comprising program code causing a computer system to perform the following steps:
   obtaining a set of annotations for at least one piece of content, wherein each annotation includes at least one term that describes a corresponding piece of content, the at least one piece of content including image data, and wherein the at least one term is drawn from the annotation lexicon;
   obtaining a plurality of computational tests, wherein the plurality of computational tests includes:
      a first computational test to determine whether the at least one term in the set of annotations meets with an expected frequency of use;
      a second computational test to determine whether any groupings of the at least one term in the set of annotations are commonly used together;
      a third computational test to determine whether any groupings of the at least one term in the set of annotations are rarely used together;
      a fourth computational test to determine which of the at least one term in the set of annotations is most predictive of the at least one piece of content; and
      a fifth computational test to determine one or more clusters of the at least one term in the set of annotations;
   analyzing the set of annotations using at least one of the plurality of computational tests to determine an effectiveness of the at least one term; and
   providing feedback based on the analyzing to develop the annotation lexicon.

12. The program product of claim 11, wherein the annotation lexicon comprises a plurality of terms for annotating the at least one piece of content, wherein the plurality of terms are interrelated with one another within the annotation lexicon, and wherein the feedback is used to improve the plurality of terms or their interrelationships with one another.

13. The program product of claim 11, wherein the plurality of computational test further comprises:
   a sixth computational test to determine whether the at least one term in the set of annotations sufficiently identifies a context of the at least one piece of content; and
   a seventh computational test to determine whether the at least one term in the set of annotations is used by multiple annotators.

14. The program product of claim 11, wherein the first computational test is based on Zipf's law, wherein the second computational test is based on a $G^2$ measurement, wherein the third computational test is based on a mutual information measurement, wherein the fourth computational test is based on an information gain measurement, and wherein the fifth computational test is based on a Laplacian eigenmap analysis.

15. A method for deploying an application for developing an annotation lexicon, comprising:
   providing a computer infrastructure that includes at least one computer device, the computer infrastructure operating to:
   obtain a set of annotations for at least one piece of content, the at least one piece of content including image data, wherein each annotation includes at least one term that describes a corresponding piece of content, and wherein the at least one term is drawn from the annotation lexicon;
   obtain a plurality of computational tests, wherein the plurality of computational tests includes:
      a first computational test to determine whether the at least one term in the set of annotations meets with an expected frequency of use;
      a second computational test to determine whether any groupings of the at least one term in the set of annotations are commonly used together;
      a third computational test to determine whether any groupings of the at least one term in the set of annotations are rarely used together;
      a fourth computational test to determine which of the at least one term in the set of annotations is most predictive of the at least one piece of content; and a fifth computational test to determine one or more clusters of the at least one term in the set of annotations;
analyze the set of annotations using at least one of the plurality of computational tests to determine an effectiveness of the at least one term; and
provide feedback based on the analyzing to develop the annotation lexicon.

* * * * *